Dec. 21, 1965   C. SOLOMONS   3,225,320
TEMPERATURE-SENSITIVE ELEMENTS
Filed Dec. 19, 1962   3 Sheets-Sheet 1

INVENTOR.
CYRIL SOLOMONS
BY Robert O. Vidas
ATTORNEY

Dec. 21, 1965  C. SOLOMONS  3,225,320
TEMPERATURE-SENSITIVE ELEMENTS
Filed Dec. 19, 1962  3 Sheets-Sheet 2

INVENTOR.
CYRIL SOLOMONS
BY Robert O. Vidas
ATTORNEY

Dec. 21, 1965     C. SOLOMONS     3,225,320
TEMPERATURE-SENSITIVE ELEMENTS
Filed Dec. 19, 1962     3 Sheets-Sheet 3

INVENTOR.
CYRIL SOLOMONS
BY Robert O. Vidas
ATTORNEY

United States Patent Office 3,225,320
Patented Dec. 21, 1965

3,225,320
TEMPERATURE-SENSITIVE ELEMENTS
Cyril Solomons, Edina, Minn., assignor to Honeywell Inc., a corporation of Delaware
Filed Dec. 19, 1962, Ser. No. 245,841
4 Claims. (Cl. 338—22)

This invention relates to thermosensitive resistance elements. More particularly, it is directed to a new type of thermistor hereinafter termed a hetero-phase thermistor. A hetero-phase thermistor, in accordance with the present invention, consists in part of a working material consisting of a plurality of substances forming a non-eutectic composition which produces pronounced changes in resistance or conductivity with changes in temperature. The invention is based on a concept that a non-eutectic composition, such as a mixture of inorganic salts, will form a heterogeneous system (solid-liquid) on being partially fused. Moreover, the resistivity of the liquid phase is related to the proportion of the dissolved salts contained therein, said proportion being directly related to the temperature of the system.

Eutectic mixtures of salts have been suggested heretofore in the art for use in temperature responsive fused salt resistors. Such mixtures cannot usefully function as a thermistor for the purpose of giving a continuous and incremental indication of resistivity change with temperature since eutectic mixtures do not form heterogeneous systems on fusing in which the composition of the liquid phase varies with temperature. Rather, the eutectic composition forms a liquid melt of constant composition, the resistivity of which does not vary in any appreciable sense due to temperature changes while at the fusion temperature the resistance changes precipitously. On the other hand, the non-eutectic compositions utilized in accordance with the present invention function as an on-off device and as a thermistor instead of merely an on-off switch as do the prior art resistors which utilize eutectic mixtures.

It is an object of this invention to provide hetero-phase thermistors which have a non-eutectic composition as a working element thereof.

It is another object of this invention to provide non-eutectic compositions of salts which form heterogeneous systems upon partial fusion capable of indicating continuous incremental resistance changes in proportion to changes in temperature.

It is a further object of this invention to provide a non-eutectic mixture of inorganic salts to provide a very sensitive thermistor capable of operating at extremely high temperature ranges.

It is still a further object of this invention to provide a hetero-phase thermistor which can be easily adapted to any desired temperature range and sensitivity by an appropriate choice of suitable non-eutectic compositions.

It is yet another object of this invention to provide a novel combination of structure and fusible non-eutectic composition in order to form a hetero-phase thermistor having distinct advantages over thermistors of the prior art.

Other objects will become apparent from the following description and drawings in which.

Figure 1:
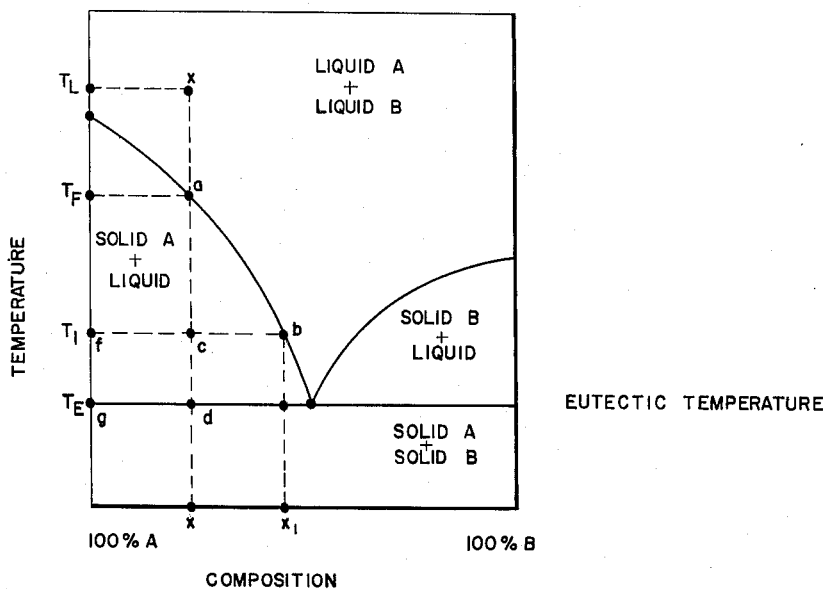
FIGURE 1 shows a typical phase diagram of two substances over a complete compositional range.

Reference is now made to FIGURE 1: the principle of operation of a thermistor in accordance with the present invention is explained in connection with this ideal hetero-phase (solid-liquid) system. This explanation is applicable also to systems in which solid solution, congruent-melting compounds, incongruent-melting compounds, peritectic compounds, and the like are formed.

Consider the phase relationships of the system composed of inorganic salts A and B, showing a eutectic type of behavior. For a composition $x$, a system on being cooled from temperature $T_L$ where it is liquid, will remain completely liquid until a temperature $T_F$ at point "$a$" is reached. At this point, a portion of solid A first separates out. Further cooling to temperature $T_1$ at point "$c$," yields a system composed of an increased quantity of solid A and a liquid of composition $x_1$ in the proportions "$c$–$b$" to "$c$–$f$," respectively. Still further cooling to below $T_E$ at point "$d$," will give rise to a completely solid system in which the solid consists of mixed crystals of A and B.

Figure 2:
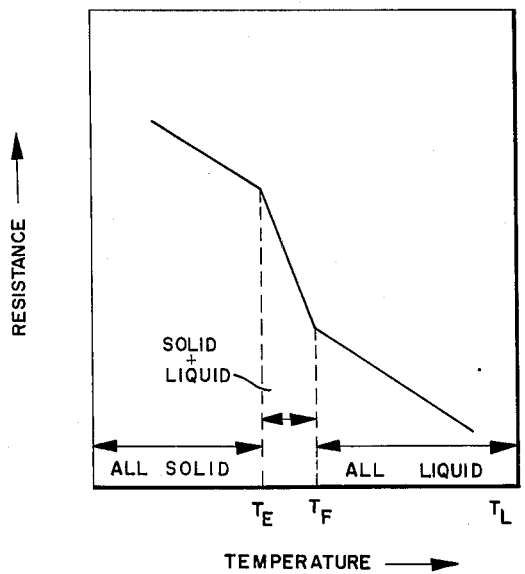
FIGURE 2 is a resistivity profile of various phases at different temperatures for a particular composition having a phase diagram as shown in FIGURE 1.

Referring now to FIGURE 2, consider the electrical conductance of composition $x$ at temperatures $T_E$, $T_F$ and $T_L$. Above $T_F$ and below $T_E$, the system will have the temperature-conductance properties of an all-liquid or an all-solid system respectively. The temperature coefficients of resistivity of these are relatively small. Between $T_E$ and $T_F$, the composition of the liquid (which will be the more highly-conducting phase) is continuously changing. Hence the conductance-temperature properties of the system between $T_E$ and $T_F$ will be such that the solid-liquid system behaves as a thermistor (i.e., its resistance rises or falls in a uniform and continuous manner with changes in temperature) rather than as in the prior art fused-salt switches (in which the resistance changes discontinuously at a fixed temperature). The hetero-phase sensor can in the region $T_E$ to $T_F$ be made as thermally sensitive or insensitive as desired by the appropriate choice of A and B and composition $x$.

The following are given as typical examples of mixtures operable in accordance with the present invention. These combinations are presented as indicative of the behavior of non-eutectic compositions and are not to be considered as limiting the scope of the present invention.

*Example 1*

Figure 3:
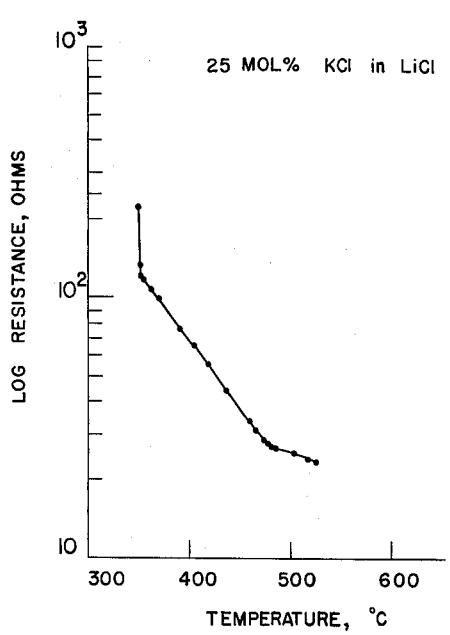
FIGURES 3 to 8 show the resistance-temperature characteristics of various non-eutectic compositions selected from binary systems.

25 mol percent potassium chloride in lithium chloride; a typical high melting binary chloride system which forms a eutectic at 42 mol percent potassium chloride. The resistance-temperature characteristics for this composition are represented by FIGURE 3 and the data below.

| State | Temperature, ° C. | $R_T$, ohms |
|---|---|---|
| Solid | 300 | 164,000 |
|  | 330 | 61,000 |
| Solid plus liquid | 380 | 86 |
|  | 420 | 55 |
|  | 470 | 30 |
| Liquid | 490 | 26 |
|  | 520 | 24 |

*Example 2*

Figure 4:
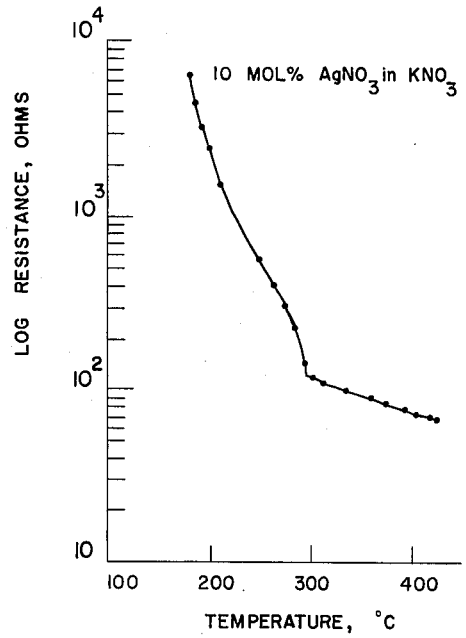

10 mol percent silver nitrate in potassium nitrate; a typical medium melting binary nitrate system which forms a eutectic at 55.6 mol percent silver nitrate. The resistance-temperature characteristics for this composition are represented by FIGURE 4 and the data below.

| State | Temperature, °C. | $R_T$, ohms |
|---|---|---|
| Solid plus liquid | 155 | 24,000 |
|  | 200 | 2,350 |
|  | 225 | 1,020 |
|  | 250 | 565 |
|  | 280 | 264 |
|  | 290 | 185 |
| Liquid | 300 | 120 |
|  | 350 | 93 |
|  | 400 | 75 |

*Example 3*

Figure 5:
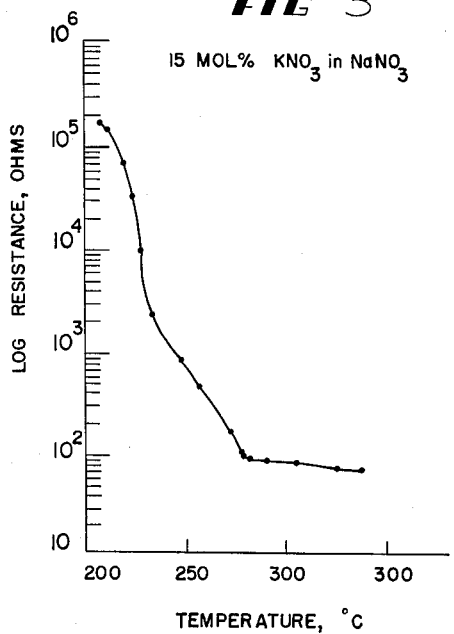

15 mol percent potassium nitrate in sodium nitrate; a typical medium melting solid-solution system. The resistance temperature characteristics for this composition are represented by FIGURE 5 and the data below.

| State | Temperature, °C. | $R_T$, ohms |
|---|---|---|
| Solid | 215 | 115,000 |
| Solid plus liquid | 230 | 5,180 |
|  | 250 | 700 |
|  | 270 | 212 |
| Liquid | 290 | 86 |
|  | 330 | 70 |

*Example 4*

Figure 6:
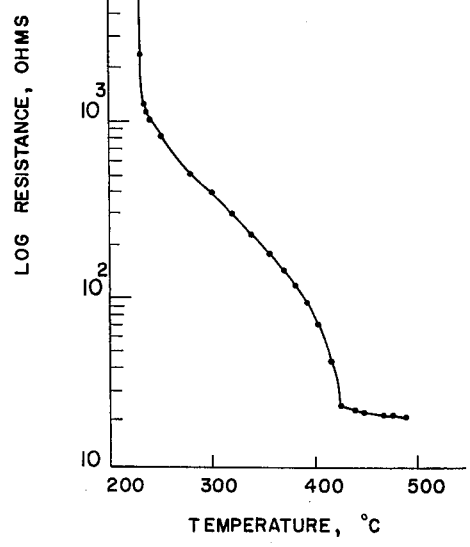

10 mol percent zinc chloride in silver chloride; a system formed from a semi-covalent salt and an ionic salt, with a eutectic at 60 mol percent zinc chloride. The resistance-temperature characteristics for this composition are represented by FIGURE 6 and the data below.

| State | Temperature, °C. | $R_T$, ohms |
|---|---|---|
| Solid | 200 | 468,000 |
|  | 220 | 180,000 |
| Solid plus liquid | 240 | 1,020 |
|  | 270 | 600 |
|  | 300 | 390 |
|  | 350 | 190 |
|  | 400 | 73 |
|  | 420 | 35 |
| Liquid | 435 | 22 |
|  | 480 | 21 |

*Example 5*

Figure 7:
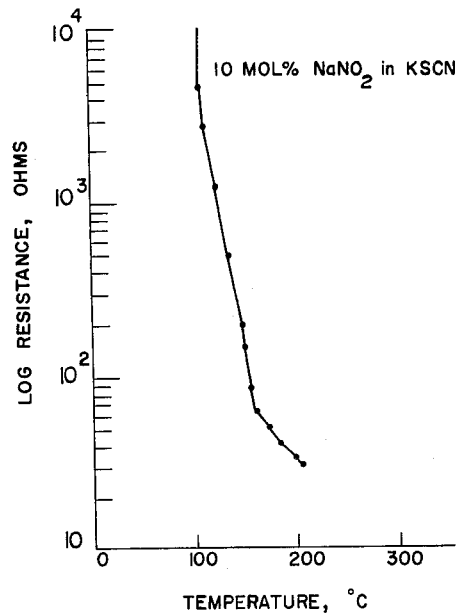

10 mol percent sodium nitrite in potassium thiocyanate; two typical low melting non-halogenoid salts. The resistance-temperature characteristics for this composition are represented by FIGURE 7 and the data below.

| State | Temperature, °C. | $R_T$, ohms |
|---|---|---|
| Solid plus liquid | 110 | 29,000 |
|  | 130 | 6,700 |
|  | 150 | 1,500 |
| Liquid | 160 | 625 |
|  | 200 | 329 |

*Example 6*

Figure 8:
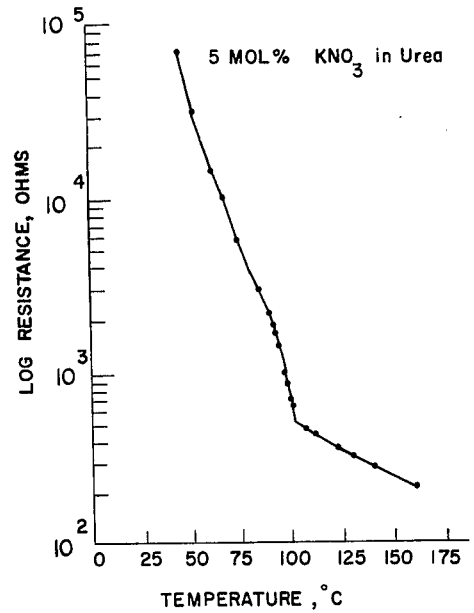

5 mol percent potassium nitrate in urea $[CO(NH_2)_2]$; a typical system of a salt in a unionized solvent. The resistance-temperature characteristics for this composition are represented by FIGURE 8 and the data below.

| State | Temperature, °C. | $R_T$, ohms |
|---|---|---|
| Solid | 40 | 1,050,000 |
|  | 60 | 167,000 |
|  | 80 | 34,000 |
| Solid plus liquid | 95 | 9,800 |
| Liquid | 110 | 4,450 |
|  | 130 | 3,210 |
|  | 150 | 2,400 |

*Example 7*

Figure 9:
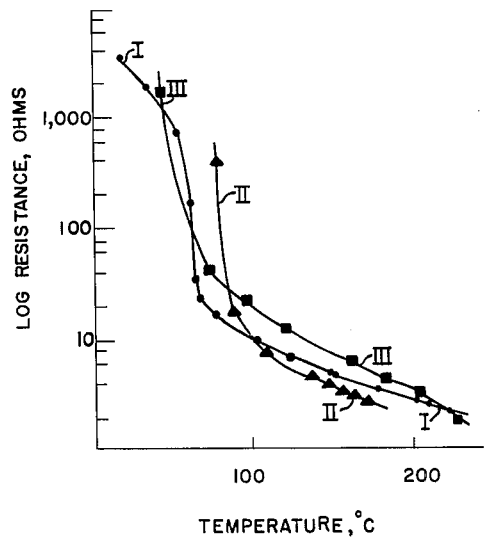
FIG. 9 shows the resistance-temperature characteristics of three non-eutectic mixtures of varying compositions selected from a ternary system.

FIGURE 9 represents the resistivity-temperature characteristics for three different ammonium nitrate-silver nitrate-lithium nitrate mixtures which form a ternary system having two eutectic points.

| Composition | Mixture Number | | |
|---|---|---|---|
|  | I | II | III |
| Percent $NH_4NO_3$ | 44 | 32.5 | 26 |
| Percent $AgNO_3$ | 11 | 32.5 | 14 |
| Percent $LiNO_3$ | 45 | 35 | 60 |

As can be seen from a study of the above data, highly sensitive thermistors can be prepared in accordance with the present invention for use at high temperatures. In addition to varying the system components, the ratio of the components in a specific system may be varied to supply a thermistor which is operable in a particular temperature range.

As stated above, the gist of the present invention is essentially the combination of a novel non-eutectic fusible composition, and a novel structure for containing said composition. If the compositions disclosed are merely incorporated into a container and contacted by electrodes, the device no longer responds as a thermistor after a few temperature cycles due to the tendency of the solid phase to solidify out at the electrodes. This causes hysterisis. To overcome this disadvantage, the material is placed in a container means consisting of a porous, non-conductive material. By placing the composition in many extremely small cavities, it is more responsive to temperature changes and the solid material is incapable of settling out of the liquid phase after repeated temperature cycling. Thus, a third parameter is added which also influences the response of the device to temperature changes. As mentioned above, the first two parameters with which conductivity or resistivity of the liquid phase vary are:

(1) Composition of liquid phase
(2) Temperature of liquid phase

The third, which is provided by the structure of the container is:

(3) Amount of liquid phase present

Closely packed powder or granules have been found suitable for such a container means. Materials such as alumina, magnesia, glass powder or beads are also suitable. In addition, the material may be sintered, but this is not necessary.

Figure 10:
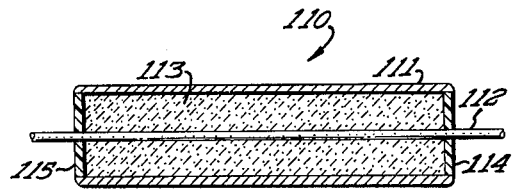
FIGURE 10 is a cross-sectional view of a hetero-phase thermistor in accordance with the present invention.

Referring now to FIGURE 10, a complete device prepared in accordance with the present invention is disclosed and generally designated by 110. The device is provided with an outer cylindrical or sleeve electrode 111 and a concentrically arranged inner electrode 112. The annular area or space between electrodes 111 and 112 is filled with a porous, non-conductive material such as alumina or the like, which is impregnated with a fusible composition in accordance with the present invention. In order to seal the ends of the device, discs 114 and 115 are provided at the terminal ends of the body. These may be made of alumina or of other suitable materials and are set in place and are retained therein by suitable means. Other suitable materials and configurations may be utilized in the preparation of a device in accordance with the present invention and will be obvious to those skilled in the art, depending upon the application desired.

What is claimed is:

1. A hetero-phase thermistor which provides a continuous incremental indication of a change in electrical resistance over a predetermined temperature range, comprising: a container means including a nonconductive, porous matrix impregnated with a solid, nonconductive, non-eutectic mixture consisting essentially of at least two chemically stable, fusible inorganic salts at least one of which is conductive in the fused state, and a pair of spaced electrodes contacting said mixture.

2. A hetero-phase thermistor which provides a continuous incremental indication of a change in electrical resistance over a predetermined temperature range, comprising: a container means including a nonconductive, porous matrix impregnated with a solid, nonconductive, non-eutectic mixture consisting essentially of potassium nitrate and sodium nitrate, and a pair of spaced electrodes contacting said mixture.

3. The hetero-phase thermistor of claim 2 in which the non-eutectic mixture consists of zinc chloride and silver chloride.

4. The hetero-phase thermistor of claim 2 in which the non-eutectic mixture consists essentially of lithium nitrate, ammonium nitrate and silver nitrate.

References Cited by the Examiner

UNITED STATES PATENTS

| | | | |
|---|---|---|---|
| 1,515,202 | 11/1924 | Hineline | 200—113.3 X |
| 2,413,125 | 12/1946 | Walbridge | 340—227 X |
| 2,487,526 | 11/1949 | Dahm et al. | 338—30 X |
| 2,627,570 | 2/1953 | Hall | 338—30 X |
| 2,842,648 | 7/1958 | Reynolds | 338—26 X |
| 3,017,592 | 1/1962 | Keller et al. | 338—28 |
| 3,064,222 | 11/1962 | Renier | 338—25 X |
| 3,089,339 | 5/1963 | Rogers et al. | 73—362 |

FOREIGN PATENTS 537,155   5/1941   Great Britain.

RICHARD M. WOOD, *Primary Examiner.*

W. D. BROOKS, H. T. POWELL, *Assistant Examiners.*